United States Patent Office 3,493,384
Patented Feb. 3, 1970

3,493,384
PREPARATION OF PROTEIN CONCENTRATES BY CENTRIFUGING A WHEAT FLOUR SLURRY IN THE PRESENCE OF A CELLULOSIC GUM
David A. Fellers, El Cerrito, Calif., assignor to the United States of America as represented by the Secretary of Agriculture
No Drawing. Original application June 8, 1966, Ser. No. 556,823. Divided and this application Dec. 20, 1968, Ser. No. 798,555
Int. Cl. A23j 1/12; A21d 2/26
U.S. Cl. 99—2                                   1 Claim

ABSTRACT OF THE DISCLOSURE

Protein concentrates are prepared from wheat flour by the following technique: The flour is slurried with water and an edible gluten-modifying agent such as methyl cellulose. The slurry is then centrifuged, yielding a supernatant liquid which contains essentially all the protein from the flour. This liquid may be dried and used as a protein supplement in bread and other foods.

---

This application is a division of my copending application Ser. No. 556,823, filed June 8, 1966.

A nonexclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for preparing protein concentrates from wheat flour. Further objects of the invention will be evident from the following description wherein parts and percentages are by weight unless otherwise specified.

It is well known that wheat flour contains valuable proteins plus various other components, primarily starch. For certain purposes it is desirable to treat the flour to obtain compositions which contain an increased proportion of protein. Such procedures are generally cumbersome because of the tendency of the flour to form sticky masses or doughs when incorporated with water and subjected to such manipulations as centrifugation.

By application of the process of the invention this stickiness problem is obviated with the result that the protein and starch components can be effectively separated.

In a practice of the invention the following procedure is employed:

A slurry of wheat flour, water, and an edible gluten-modifying agent is prepared. In preparing this slurry, one generally uses about 1 to 3 parts of water per part of flour. A preferred proportion which provides a slurry thin enough for easy handling, yet employs a minimum of water (to reduce the expense of drying the protein concentrate eventually obtained), is 1.5 parts of water per part of flour. The critical component in the slurry is the gluten-modifying agent. This substance exerts the important effect of modifying the wheat protein (gluten) so that its tendency to form a dough or other sticky material is markedly decreased.

In preparing the slurry, the three components—flour, water, and gluten-modifying agent—may be combined all at once. Alternatively, the other components may be added sequentially to the water. Preferably, where the gluten-modifying agent is a water-soluble material, the following technique is used: The gluten-modifying agent is dissolved in the water. Then, the flour is incorporated in the resulting solution to form the slurry. Where the gluten-modifying agent is a water-insoluble material—for example, an edible oil—the following technique is preferred: A part of the flour (for example, ¼ of the total amount) is incorporated with the water, the oil is then stirred in, and finally the remainder of the flour is incorporated into the system.

Having prepared the slurry of water, flour, and gluten-modifying agent, this slurry is then subjected to centrifugation. This causes formation of a system containing plural phases: A dense bottom phase; a supernatant liquid phase; and, in some cases, a sludge phase between the bottom phase and the supernatant liquid phase. The bottom phase contains essentially all the prime starch from the flour in almost a pure state. This prime starch phase being in a granular condition, completely free from stickiness, can be readily separated from the remainder of the system, and can be readily processed as by washing with water and drying to prepare a high grade starch for any desired use. Essentially all the protein from the flour is contained in the supernatant liquid, or divided between the supernatant and sludge phases where both are present. Both the supernatant and sludge phases are free from stickiness and gumminess so that they can be readily handled, removed from the starch phase, etc. The supernatant liquid and the combined supernatant and sludge phases where both are present constitute valuable protein concentrates useful for many purposes. Typically, the protein concentrates may be dried and used as a protein supplement in bread and other foods, in mixed animal feeds, etc. Also, the protein concentrates can be used as a base for preparing milk-like beverages.

In accordance with the invention various substances may be employed as the gluten-modifying agent, for example: Water-soluble proteins such as soybean protein, gelatin, sodium caseinate, and substances containing casein, e.g., dried milk; edible (glyceride) oils, such as soybean oil, peanut oil, corn oil, cottonseed oil, safflower oil, olive oil, and the like; water-soluble cellulosic gums such as methyl cellulose and carboxymethy cellulose; phospholipids such as lecithin and cephalin. These substances may be used individually or as admixtures of two or more. The gluten-modifying agent is operative over a wide range of proportions. Usually, it is preferred to use the minimum effective amount of the agent and generally this will be in the range from about ½ to about 5 parts thereof per 100 parts of flour. Larger proportions may be used—for example, up to 30 parts per 100 parts of flour—but they exert little, if any, extra benefit.

In the process of the invention, essentially all of the added gluten-modifying agent appears in the protein concentrate; that is, it is in the supernatant liquid or divided between the supernatant and sludge layers where both of these phases are present. The occurrence of the additive in the final product is not a detriment it is an edible material and may even add to the nutritive value of the protein concentrate. This is the case, for example, where the additive is a protein or edible oil. The presence of the edible oil in the protein concentrate is especially desirable where the latter is to be converted into a milk-like beverage of full-fat charactered in that no extra fat need be added to achieve this end.

Ordinarily, for convenience, the slurry of flour, water, and glutten-modifying agent is prepared at room temperature. However, it has been observed that special benefits are attained at lower temperatures, i.e., the intermediate sludge layer has a more liquid character and is easier to remove from the centrifuge. Accordingly, in a preferred modification of the invention, the slurry is prepared in the cold, that is, at a temperature below room temperature but not so low as to cause the slurry to become frozen. For best results, the temperature is lowered to a point just above freezing, for example, about a degree above 32° F. so that the slurry remains a liquid. The benefit of the lowered temperature is primarily achieved when the slurry is prepared in the cold. However, it is also beneficial to maintain the low temperature when the slurry is centrifuged.

The invention is further demonstrated by the following illustrative examples.

EXAMPLE 1

Wheat flour (1 part) was slurried with 1.5 parts of water. To different lots of the slurry was added corn oil in various proportions (as given below) and the mixtures stirred in a blender for 1–5 minutes. Each of the slurries, a room temperature, was then centrifuged for 5 minutes at 1000 r.p.m. In each case, it was observed that the slurry separated into a supernatant liquidous layer and a lower layer of prime starch. The supernatant layer was removed to yield the desired protein concentrate.

The results obtained are tabulated below.

| Run | Corn oil added, percent (on wt. of flour) | Starch removed, percent (dry basis, on wt. of flour) | Increase in concentration of protein, percent (dry basis) |
|---|---|---|---|
| 1 | 4.2 | 55.9 | 208 |
| 2 | 8.4 | 52.0 | 178 |
| 3 | 12.5 | 56.3 | 178 |

EXAMPLE 2

The procedure of Example 1 was repeated substituting various other agents for the corn oil. In all cases it was observed that the slurry on centrifugation separated properly into the supernatant liquid and prime starch phases.

The results are summarized in the following table.

| Run | Additive and proportion thereof, percent based on wt. of flour | Starch removed, percent dry basis on wt. of flour | Increase in concentration of wheat protein, percent dry basis |
|---|---|---|---|
| 4 | Soybean protein, 5 | 55.0 | 200 |
| 5 | Soybean protein, 15 | 52 | 159 |
| 6 | Methylcellulose, 1.3 | 46 | 180 |
| 7 | Methylcellulose, 3.9 | 44 | 167 |
| 8 | Soybean protein, 5 <br> Corn oil, 4.5 | 60 | 201 |
| 9 | Gelatin, 15 | 58 | 140 |
| 10 | Lecithin, 5 <br> Corn oil, 4.5 | 48 | 163 |

EXAMPLE 3

A series of runs were made, using the following technique:

Wheat flour (1 part) was slurried with water (1.5 parts). To different lots of the slurry was added, with stirring, non-fat dry milk solids in various proportions (given below). In one of the runs, nothing was added to provide comparative data. The slurries were then centrifuged for 5 minutes at 1500 r.p.m. The results are tabulated below:

| Run | Amount of non-fat dry milk solids added, percent based on wt. of flour | Starch removed, percent dry basis on wt. of flour | Increase in concentration of wheat protein, percent dry basis |
|---|---|---|---|
| 11 | Non added | 51 | 204 |
| 12 | 2.5 | 57 | 220 |
| 13 | 5.0 | 54 | 192 |

It was further observed that in run 11, the centrifuged material was sticky and gummy so that it was difficult to separate the starch from the supernatant. In runs 12 and 13 the centrifuged material was in two phases: Prime starch and supernatant liquid. Moreover, in these runs there was no stickiness or gumminess and the supernatant and starch layers could be separated easily and completely.

A particularly important advantage of the invention is that it yields protein concentartes which contain valuable components which are normally lost in conventional procedures for separating the starch and protein components of wheat flour. The feature of the invention will be evident from the following explanation:

In conventional methods, a dough of flour and water is formed and then subjected to kneading while exposed to sprays of water. In this operation the starch and water-soluble components are washed away, leaving a mass of gluten. Starch is readily recovered from the wash water because it is suspended (not dissolved) therein. Thus, it can easily be segregated by flowing the water over riffles or the like. However, the substances that are actually dissolved cannot be effectively recovered because of their soluble character and the large volume of wash water in which they exist. These soluble components include water-soluble proteins, vitamins of the B group, minerals, and sugars. It may be noted that the water-soluble proteins are mostly albumins which are particularly desired from a nutritive standpoint in that they contain a balanced proportion of amino acids. Gluten, in contrast, is deficient in the essential amino acid lysine. It is evident from the above explanation that the conventional p.rocedure yields a protein concentrate, i.e., gluten, which is lacking in the valuable water-soluble components of the flour. In contrast, however, the invention surmounts this deficiency in that the protein concentrates contain all the desired components of the flour, including those of a water-soluble nature, e.g., water-soluble proteins, vitamins, minerals and sugars. Thus in the process of the invention, the centrifugation causes a segregation only of the prime starch; the desired components—including the gluten and the water-soluble proteins, vitamins, minerals, and sugars—are concentrated in the supernatant liquid phase (or in the supernatant and sludge phases, where both are present). Accordingly, the concentrates produced in accordance with the invention constitute compositions of matter not hitherto known and which possess significant advantages over the known concentrates.

Having thus described the invention, what is claimed is:

1. A method for preparing a protein concentrate from wheat flour which comprises:
   (a) preparing a slurry of wheat flour, water, and an edible gluten-modifying agent to decrease the tendency of flour to form a dough,
   (b) centrifuging the slurry to segregate the starch from the proteinous components of the flour, and
   (c) removing the segregated starch to obtain a proteinous composition of increased protein concentration,
   (d) the said edible gluten-modifying agent being a water-souble cellulosic gum.

References Cited

UNITED STATES PATENTS

| 3,009,812 | 11/1961 | Ganz | 99—139 |
| 3,012,888 | 12/1961 | Davis et al. | 99—15 |
| 3,290,152 | 12/1966 | Hartman | 99—17 |

OTHER REFERENCES

Mark et al.: "Encyclopedia of Polymer Science and Technology," vol. 3, 1966, pp. 520 and 533–536.

WILLIAM H. SHORT, Primary Examiner

HOWARD SCHAIN, Assistant Examiner

U.S. Cl. X.R.

99—17, 54, 90; 127—67; 260—112